Patented Feb. 11, 1930

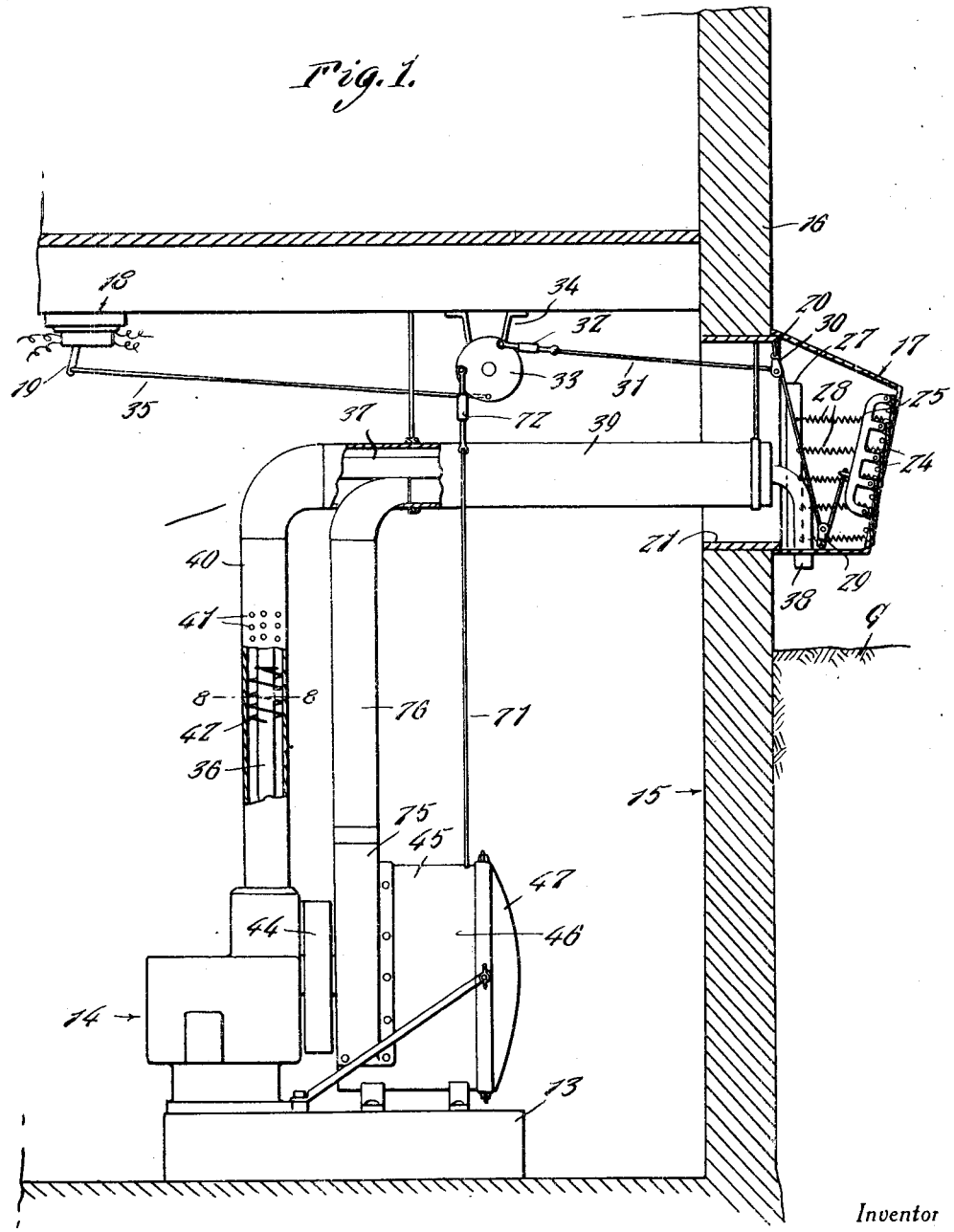

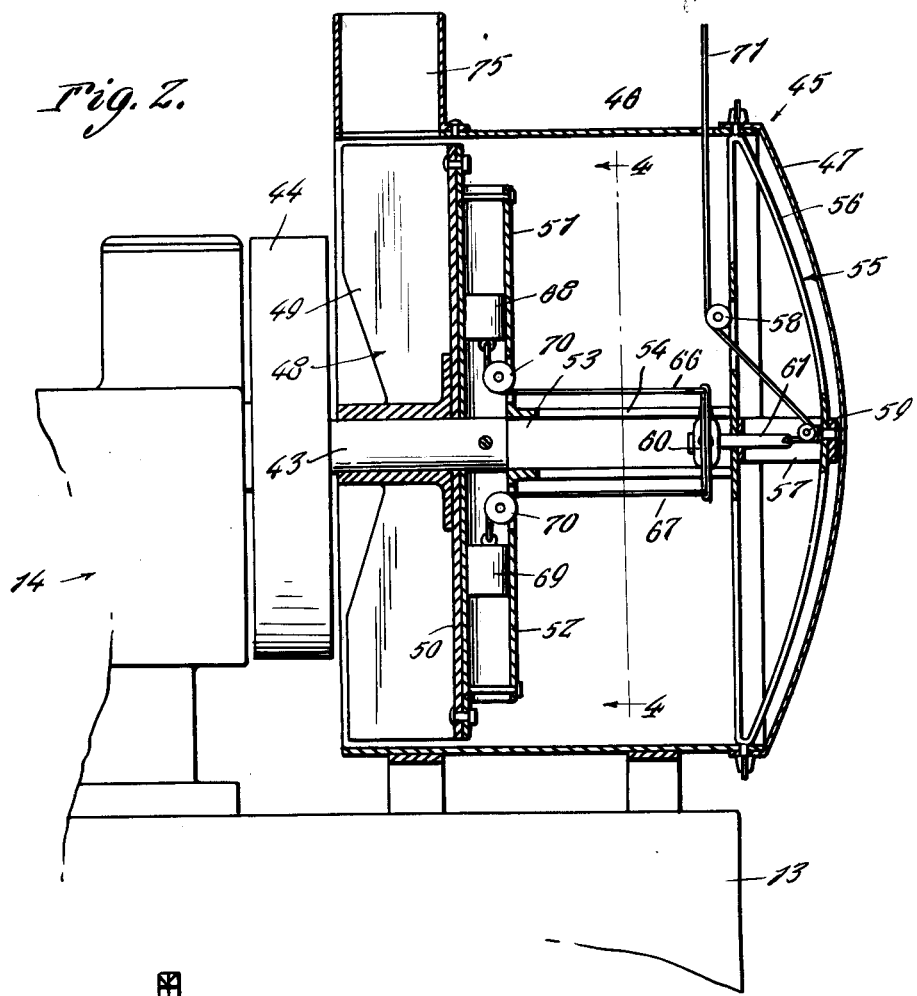
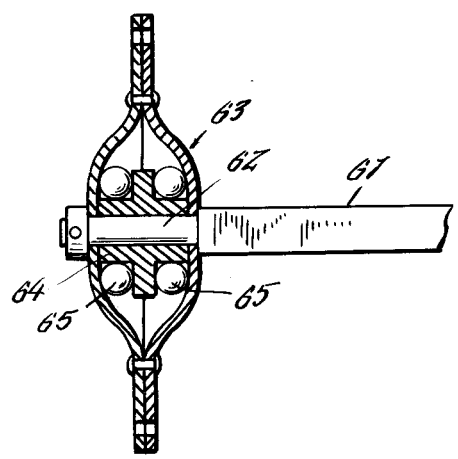

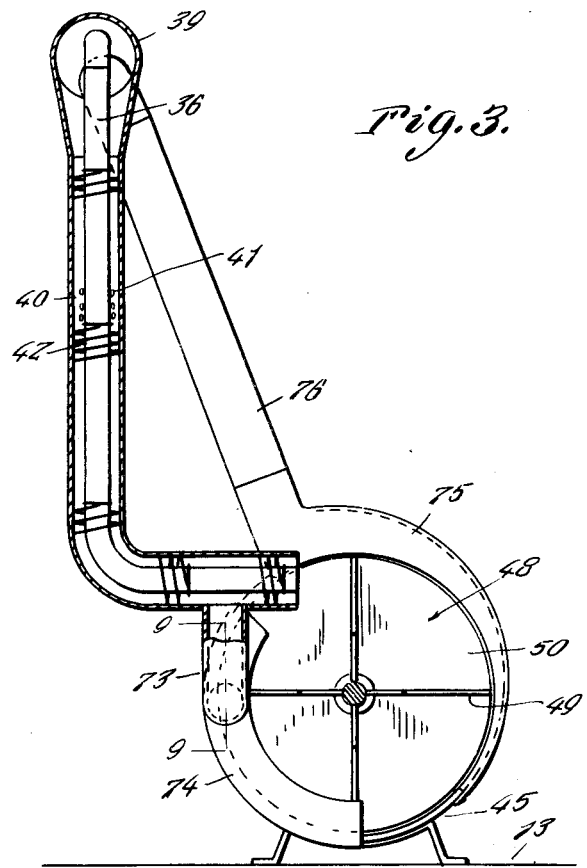
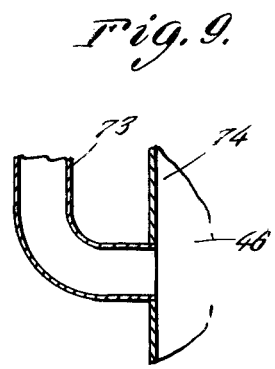
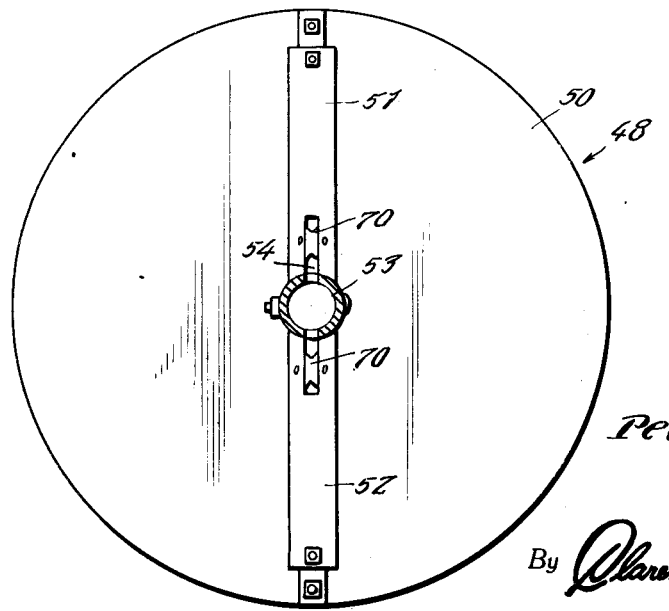

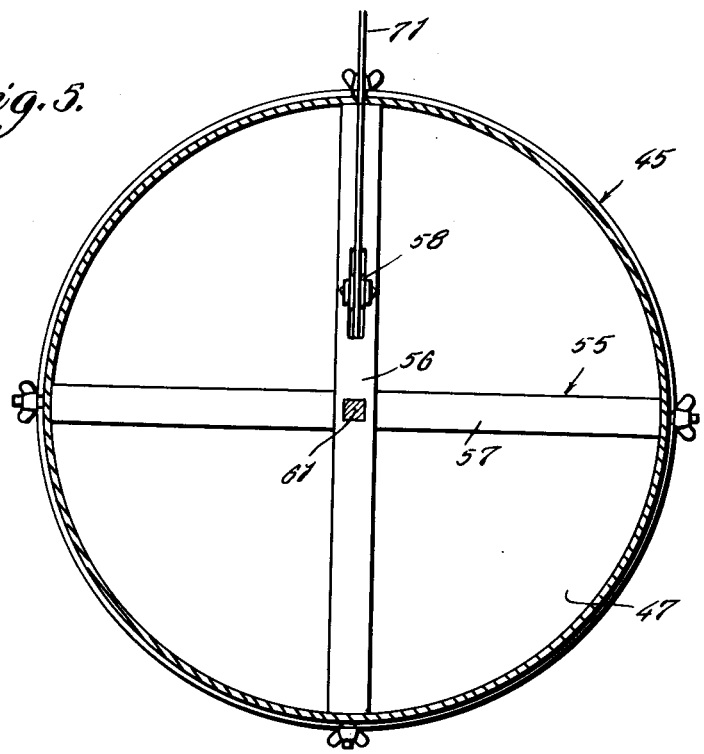
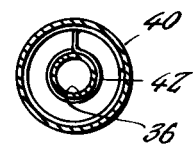
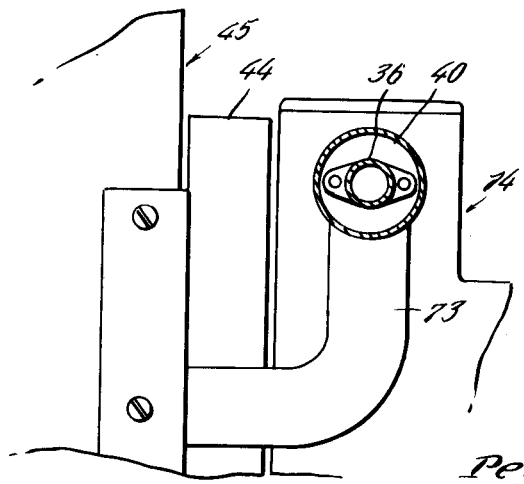

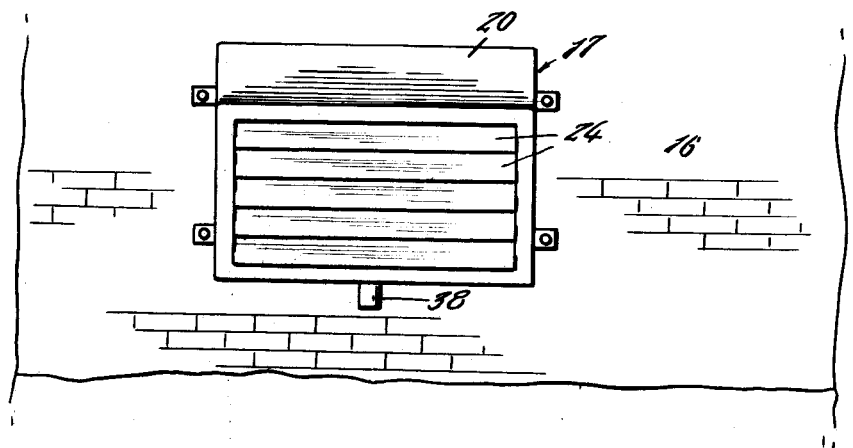
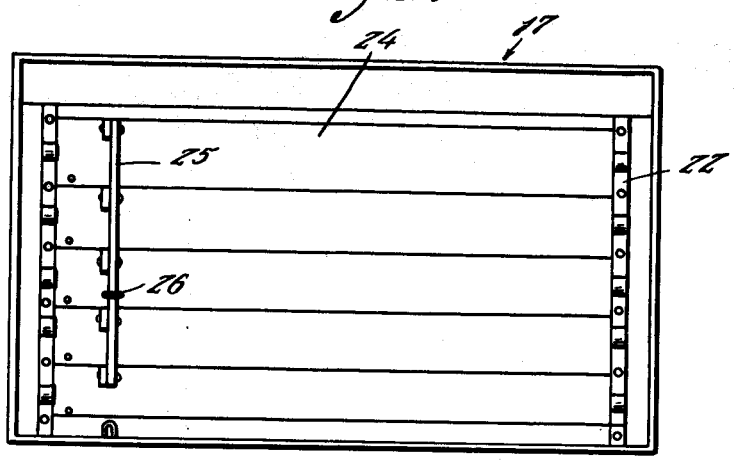
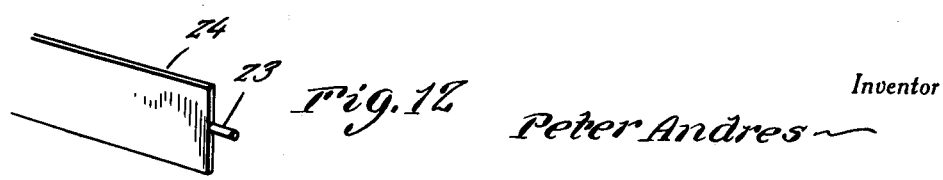

1,747,042

UNITED STATES PATENT OFFICE

PETER ANDRES, OF BELDING, MICHIGAN

COOLING AND VENTILATING APPARATUS

Application filed April 18, 1929. Serial No. 356,125.

This invention relates to an improved apparatus which is especially designed for use in association with a domestic power plant and it has more particular reference to a structure of this class which has facilities incorporated therein for ventilating and cooling the enclosure in which the power plant is installed.

It is a matter of common knowledge that domestic power plants such as are employed in modern homes for supplying electrical current for household purposes develop an undesirable degree of heat, especially in warm weather thus rendering such devices objectionable.

As a result of this I have evolved and produced a compact and convenient arrangement of details organized in a systematic and practical manner to provide a dependable apparatus which may be conveniently installed in the enclosure and arranged for cooperation with the power plant to minimize undesirable heat by promoting proper ventilation of the enclosure and by cooling the enclosure through the medium of novel hot air extracting means.

In carrying the invention into actual practice I utilize various facilities and mechanical agents which are closely allied in a mechanical sense to accomplish both the ventilating and cooling results in an expedient and efficient manner.

These specific details and their particular association and arrangement will become more readily apparent from the following description and drawings.

In the drawings:

Figure 1 represents a sectional view, of a fragmentary type, through the cellar of a building showing the improved apparatus, constructed in accordance with the present invention, located therein.

Figure 2 is an enlarged section through a principal portion of the apparatus which is intimately associated with the power plant.

Figure 3 is a vertical sectional view through the structure seen in Figure 1.

Figure 4 is a section taken approximately upon the plane of the line 4—4 of Figure 2.

Figure 5 is a similar section through the right hand end portion of the structure seen in Figure 2.

Figure 6 is a fragmentary section on an enlarged scale showing certain of the details seen in Figure 3.

Figure 7 is a fragmentary detail view in section and elevation of a longitudinally shiftable cross head such as is seen in Figure 2.

Figure 8 is a cross section on the line 8—8 of Figure 1.

Figure 9 is a section taken approximately on the line 9—9 of Figure 3.

Figure 10 is an elevational view of the externally disposed register.

Figure 11 is an inside elevational view of said register.

Figure 12 is a perspective view of one of the shutters employed in the construction of the register.

The general arrangement of parts may well be observed in Figure 1. Reference being had to this figure it will be seen that 13 designates a base on which the power plant generally designated by the reference character 14 is supported, these details being arranged within the enclosure. Here the enclosure is in the form of a cellar generally represented by the reference characters 15 and including a brick side wall 16. The reference character G designates the ground on the exterior of the building. The power plant here is for supplying electrical current for household purposes such as for instance the plant of the Delco type.

Associated with the wall 16 and projecting into the exterior of the building is a register structure generally designated by the reference character 17. The reference character 18 designates an electric switch supported from the ceiling of the cellar and having an operating lever 19. This switch is adapted to be connected with a signal light (not shown) which constitutes a part of the apparatus and which shows when the power plant and apparatus is in operation. An audible signal such as bell may of course be substituted, but a light is preferable. The idea of the apparatus as before intimated is to introduce atmospheric air from the exterior to the interior of the cellar for ventilating purposes and also to extract heated air from the exhaust and power plant and to conduct it to the exterior.

Considering first the construction of the register it will be seen that this comprises an appropriately designed casing 20 attached to the wall opening lining 21 projecting outwardly beyond it. Supported in this casing as seen in Figure 11 are vertical strips 22 constructed to provide bearings for oscillatory reception of pintles 23 on the ends of overlapping shutters 24. An operating frame 25 is connected with crank arms on these shutters for simultaneously opening and closing them. This frame carries an eye 26 which serves the purpose to be hereinafter described. The reference character 27 designates a standard within the casing having springs 28 connected thereto and with the shutters for normally maintaining the shutters closed. In this casing are pulleys 29 and 30 over which an operating cord 31 is trained. This cord is provided with a turn buckle 32 having eccentric connection with an operating disc 33 suspended from the hanger 34. Novel means which will hereinafter be described is to be provided for actuating the disc 33 and opening the shutter through the medium of the cord 31. In this connection I invite attention to the reference character 35 which designates a similar operating member in the form of a rod having eccentric connection with the disc 33 and operating connection with the switch lever 19. Thus the switch and shutters are simultaneously operable.

The power plant includes an exhaust pipe 36 having vertical and horizontal branches with the horizontal bracket 37 extending outwardly through the wall opening terminating in a downturned discharge 38. This exhaust pipe is confined in a tubular casing including a horizontal portion 39 and a vertical portion 40, the portion 40 being provided with air ports 41. It is to be observed that the tubular casing is spaced from the exhaust pipe, and the exhaust pipe is mounted therein through the medium of coiled springs 42, as better shown in Figure 3, and detailed in Figure 8.

I now invite attention to Figure 2 wherein it will be observed that the reference character 43 designates a shaft on which a fly wheel 44 is mounted. Associated with this shaft and fly wheel is a novel mechanism including a metallic housing designated by the reference character 45. This housing includes a cylindrical body portion 46 which is open at the left hand end and which is provided at its opposite end with a convex closure or cap 47. This housing is principally intended to accommodate a rotary fan 48 carried by the shaft 43. The fan is provided with radial blades 49 and these are mounted on a disc 50. The disc constitutes a mounting for a centrifugal governor. The governor here comprises an open ended sleeve including branches 51 and 52 respectively. The sleeve carries a central horizontally disposed tubular guide 53 having a longitudinal guide slot 54 at diametrically opposite points. The right hand end of the sleeve in Figure 2 abuts a frame structure 55 confined within the housing. This frame is made up of a vertical bow 56 and a horizontal bow 57 disposed at right angles to each other, and the frame is suitably fastened in the housing. In addition, it constitutes a support for pulleys 58 and 59 respectively which serve a purpose to be hereinafter described. A cross head generally designated by the reference character 60 is associated with the tubular guide 53. As seen in Figure 7 this comprises a rectangular stem 61 slidable through guide openings in the intersecting portions of the bows 56 and 57 as seen in Figure 2. This stem includes a spindle portion 62 which constitutes a journal for a rotary housing 63 of general disc like configuration. In this housing is a bushing 64 surrounding the spindle and cooperating with anti-friction ball bearings 65. This arrangement provides an appropriate mounting of the head 63. Connected at diametrically opposite points with this head are flexible elements 66 and 67 which are in turn connected at their ends with weights 68 and 69, respectively, slidable in the branches 51 and 52, respectively. Pulleys 70 are provided and cords or flexible elements 66, 67 are passed over the pulleys whereby to provide a novel centrifugal governor. Closely associated with this structure is an operating cable 71 trained over the pulleys 58, 59 and connected with the stem 61 at one end and connected at its opposite ends with a turn buckle 72 which is in turn eccentrically connected to the aforesaid operating or actuating disc 33 in Figure 1. This housing structure 45 and the internal mechanism is of course supported from the base 13 adjacent the fly wheel and the fan therein has a double function of producing suction as well as pressure for relieving cellar of heat otherwise produced by the exhaust pipe of the power plant. Referring to Figure 3 it will be seen that the casing, that is the vertical branch 40 which surrounds the corresponding portion of the exhaust pipe, is connected with the open side of the fan housing as at 73, an arcuate flange 74 being provided for this purpose in order to leave the housing open on this side, then at a substantially diametrically opposite side is an arcuate pocket or shield 75 with which a blower pipe 76 is connected. This pipe extends upwardly and in turn is connected with the discharge branch 39 of the casing as seen in Figure 1.

The operation of the apparatus is as follows: When the power plant is in operation the fly wheel 44 is set in rotation, and this in turn rotates the shaft 43. The result is that the fan 48 and the centrifugal governor carried thereby rotate at a corresponding speed. Under this rotary action of the governor the cross head structure 63 is brought into action. Naturally the weights 68 and 69 fly outwardly in their enveloping tubular guides or branches 51 and 52. This shortens the pull cords 66, 67 and slides the cross head structure in the guide slot 64. The cable 71 being attached to this structure is drawn upon to produce a short rotary motion of the disc 33. This action reacts upon the cord 31 and through the medium of the shutter mechanism the shutters to the ventilator structure 17 are swung open against the action of the spring 28. Hence, as long as the power plant is in operation these shutters are maintained opened. The moment however that the plant stops operating the springs close the shutters to prevent the entrance of insects.

At the same time the ventilator is open, the electric switch 18 is closed to operate the electric circuit in which the signal bulb is included. Hence the bulb is illuminated so long as the plant is in operation to visibly notify the attendant.

In addition the cooling means is brought into play when the plant is set into operation. In other words the rotation of the fan sucks heated air from the casing structure around the exhaust pipe and conducted through the blower pipe 76 and out through the branch 39 of the casing.

The improved apparatus as will be clear is characterized by compactness, in convenience and arrangement of parts so correlated as to insure dependable operation and to permit the structure to fulfil the requirements of an invention of this class in a satisfactory manner.

It is thought by considering the description in connection with the drawings a clear understanding of the construction, operation, features and advantages of the improved apparatus will be had, for which reason a more lengthy description is deemed to be unnecessary.

Minor changes in shape, size, material and rearrangement of details coming within the field of invention claimed may be resorted to in actual practice if desired.

Having thus described the invention, what I claim as new and desire to secure by Letters Patent is:—

1. In an apparatus of the class described, in combination, an enclosure, said enclosure including a wall exposed to the outside atmosphere, a ventilator mounted in said wall and communicating with the atmosphere and enclosure, a power plant in said enclosure, and automatic operating means for said ventilator operatively connected with and under the control of said power plant.

2. In an apparatus of the class described, in combination, an enclosure, said enclosure including a wall exposed to the outside atmosphere, a ventilator mounted in said wall and communicating with the atmosphere and enclosure, a power plant in said enclosure, and automatic operating means for said ventilator operatively connected with and under the control of said power plant, together with cooling means for said power plant associated with the plant and ventilator.

3. In an apparatus of the class described, in combination, an enclosure including an outside wall, a ventilator supported in the wall and including a register and means for normally maintaining the register closed, a power plant in said enclosure, and an operating connection between the power plant, and register for opening the register when the the power plant is in operation and permitting closing of the register when the power plant is silent.

4. In an apparatus of the class described, in combination, an enclosure including an outside wall, a ventilator supported in the wall and including a register and means for normally maintaining the register closed, a power plant in said enclosure, and an operating connection between the power plant, and register for opening the register when the power plant is in operation and permitting closing of the register when the power plant is silent, an electric signal current switch in said enclosure operatively connected with the register operating means.

5. In an apparatus of the class described, in combination, an enclosure including an outside wall, a ventilator supported in the wall and including a register and means for normally maintaining the register closed, a power plant in said enclosure, and an operating connection between the power plant, and register for opening the register when the power plant is in operation and permitting closing of the register when the power plant is silent, an electrical signal current switch in said enclosure operatively connected with the register operating means, and a cooling system for said power plant including piping associated with the exhaust means of the power plant and in alinement with said register.

6. In an apparatus of the class described, in combination, an enclosure including an outside wall having an air intake and discharge opening therein, a ventilator associated with said opening and including a casing having a shutter equipped with a register with means normally maintaining the shutter closed, a power plant within said enclosure, and an operating connection between the power plant and shutter of said ventilator whereby when the power plant is in operation, the shutters will be opened to ventilate the enclosure.

7. In a structure of the class described, in combination, an enclosure including a wall having an air intake and a discharge opening, a ventilator supported on said wall and in alinement with said opening and including a casing provided with closing shutters and spring means for normally maintaining the shutters closed, a power plant in said enclosure, a hanger in said enclosure, a disc mounted for rotation from said hanger, an operating connection between the disc and shutters, and an operating connection between the disc and said power plant.

8. In a structure of the class described, in combination, an enclosure including a wall having an air intake and a discharge opening, a ventilator supported on said wall and in alinement with said opening and including a casing provided with closing shutters and spring means for normally maintaining the shutters closed, a power plant in said enclosure, a hanger in said enclosure, a disc mounted for rotation from said hanger, an operating connection between the disc and shutters, an operating connection between the disc and said power plant, said last named operating connection embodying a flexible cable having eccentric connection with said disc, together with a centrifugal governor device operatively connected with a rotating shaft constituting a part of said power plant.

9. In a structure of the class described, in combination, an enclosure including an outside wall having an air intake and discharge opening, a power plant in said enclosure including a rotary shaft and a fly wheel mounted on said shaft together with an exhaust pipe, a fan mounted for rotation on said shaft, a housing enclosing said fan, a casing surrounding said exhaust pipe and having one end extending through said wall opening and having the opposite end operatively associated with said fan, and a blower pipe also associated with said fan housing and connected with that portion of said casing extending through said wall opening.

10. In a structure of the class described, in combination, a power plant including a rotary shaft and a fly wheel on said shaft, a fan fixedly mounted on said shaft for rotation therewith, a housing surrounding said fan, a centrifugal governor carried by said fan, a ventilator and an operating connection including a cable connected with said centrifugal governor.

In testimony whereof I affix my signature.
PETER ANDRES.